United States Patent
Ye et al.

(10) Patent No.: US 12,498,828 B2
(45) Date of Patent: Dec. 16, 2025

(54) INFRARED TOUCH SCREENS AND DISPLAY DEVICES

(71) Applicants: SHENZHEN HUASHENG SOFTWARE TECHNOLOGY CO., LTD., Guangdong (CN); TCL BUSINESS INFORMATION TECHNOLOGY (HUIZHOU) CO., LTD., Guangdong (CN)

(72) Inventors: Xiongbo Ye, Guangdong (CN); Hua Huang, Guangdong (CN)

(73) Assignees: SHENZHEN HUASHENG SOFTWARE TECHNOLOGY CO., LTD., Shenzhen (CN); TCL BUSINESS INFORMATION TECHNOLOGY (HUIZHOU) CO., LTD., Huizhou (CN)

( * ) Notice: Subject to any disclaimer, the term of this patent is extended or adjusted under 35 U.S.C. 154(b) by 0 days.

(21) Appl. No.: 18/569,691

(22) PCT Filed: Jun. 30, 2022

(86) PCT No.: PCT/CN2022/102878
§ 371 (c)(1),
(2) Date: Dec. 13, 2023

(87) PCT Pub. No.: WO2023/056765
PCT Pub. Date: Apr. 13, 2023

(65) Prior Publication Data
US 2024/0272750 A1    Aug. 15, 2024

(30) Foreign Application Priority Data

Oct. 8, 2021 (CN) .......................... 202122420216.1

(51) Int. Cl.
*G06F 3/042* (2006.01)
*G02F 1/1333* (2006.01)

(52) U.S. Cl.
CPC ........ *G06F 3/0421* (2013.01); *G02F 1/13338* (2013.01)

(58) Field of Classification Search
CPC combination set(s) only.
See application file for complete search history.

(56) References Cited

U.S. PATENT DOCUMENTS 8,570,288 B2 * 10/2013 Lai .......................... G06F 3/041
345/173
9,547,338 B2 * 1/2017 Berg ................. B29C 45/14336
(Continued)

FOREIGN PATENT DOCUMENTS

CN 202694301 U 1/2013
CN 102968223 A * 3/2013 ........... G06F 3/0428
(Continued)

OTHER PUBLICATIONS

International Search Report in International application No. PCT/CN2022/102878, mailed on Sep. 7, 2022.
(Continued)

*Primary Examiner* — Ke Xiao
*Assistant Examiner* — Emily J Frank
(74) *Attorney, Agent, or Firm* — Nathan & Associates; Menachem Nathan

(57) ABSTRACT

An infrared touch screen and a display device are provided. The infrared touch screen includes: a cover having a light entrance surface and a light exit surface connected through a first side surface; a first light-transmitting frame provided with a first installation groove and connected to the cover; and an infrared light source installed in the first installation groove and located on a side of the cover close to the light (Continued)

entrance surface. A first protrusion part is provided on a side of the first light-transmitting frame away from the infrared light source and configured to emit at least part of the infrared light received from the infrared light source.

16 Claims, 3 Drawing Sheets

(56) References Cited

U.S. PATENT DOCUMENTS

| | | | |
|---|---|---|---|
| 2019/0025984 A1 | 1/2019 | Weilbacher et al. | |
| 2021/0333915 A1* | 10/2021 | Zhou | G06F 3/042 |
| 2022/0286545 A1* | 9/2022 | Koch | G06F 1/1637 |

FOREIGN PATENT DOCUMENTS

| | | |
|---|---|---|
| CN | 103019481 A | 4/2013 |
| CN | 203012683 U | 6/2013 |
| CN | 203012685 U | 6/2013 |
| CN | 203012686 U | 6/2013 |
| CN | 203070255 U | 7/2013 |
| CN | 203311382 U | 11/2013 |
| CN | 216352273 U | 4/2022 |
| WO | 2014/086084 A1 | 6/2014 |

OTHER PUBLICATIONS

Written Opinion of the International Search Authority in International application No. PCT/CN2022/102878, mailed on Sep. 7, 2022.
The extended European search report in European application No: 228777900, mailed on Aug. 7, 2025.

* cited by examiner

INFRARED TOUCH SCREENS AND DISPLAY DEVICES

CROSS REFERENCE TO RELATED APPLICATIONS

This application is a national phase Application of International Application No. PCT/CN2022/102878, filed on Jun. 30, 2022, which is based upon and claims priority to the Chinese patent application No. 202122420216.1, filed on Oct. 8, 2021. The disclosure of the above applications are incorporated herein by reference in their entirety.

TECHNICAL FIELD

The present disclosure relates to touch control technologies, and more particularly, to infrared touch screens and display devices.

BACKGROUND

An infrared touch screen is formed by setting an infrared light source and an infrared receiver on a screen surface of a touch screen. When any object touches the screen surface and blocks infrared light from the infrared light source to the infrared receiver, the infrared touch screen can detect a screen touch operation by the object.

Compared with capacitive touch screens, infrared touch screens have the advantages of low manufacturing cost, easy installation, high explosion resistance, and high reliability. Therefore, the infrared touch screens are widely used in various fields. However, generally, a frame of an infrared touch screen is too high relative to a screen surface thereof, which affects an overall visual appearance of the infrared touch screen.

SUMMARY

The present disclosure provides infrared touch screens and display devices to solve a problem that a frame of an infrared touch screen is too high relative to a screen surface of the infrared touch screen.

In a first aspect, some embodiments of the present disclosure provide an infrared touch screen, including:
- a cover having a light entrance surface, a light exit surface arranged opposite to the light entrance surface, and a first side surface through which the light entrance surface is connected to the light exit surface;
- an infrared light source configured to emit infrared light; and
- a first light-transmitting frame arranged on a side of the cover having the first side surface and connected to the cover. The first light-transmitting frame is provided with a first installation groove, and the infrared light source is installed in the first installation groove and is located on a side of the cover close to the light entrance surface. A first protrusion part is provided on a side of the first light-transmitting frame away from the infrared light source, and the first protrusion part is configured to receive at least part of the infrared light from the infrared light source and emit the at least part of the infrared light in a direction parallel to the light exit surface.

In a second aspect, some embodiments of the present disclosure further provide an infrared touch screen, including:
- a cover having a light entrance surface, a light exit surface arranged opposite to the light entrance surface, and a second side surface through which the light entrance surface is connected to the light exit surface;
- an infrared receiver configured to receive infrared light;
- a second light-transmitting frame arranged on a side of the cover having the second side surface and connected to the cover. The second light-transmitting frame is provided with a second installation groove, and the infrared receiver is installed in the second installation groove and located on a side of the cover close to the light entrance surface. A second protrusion part is provided on a side of the second light-transmitting frame away from the infrared receiver, and the second protrusion part is configured to redirect the infrared light, propagating in a direction parallel to the light exit surface, toward the infrared receiver.

In a third aspect, some embodiments of the present disclosure further provide a display device, including the infrared touch screen as described above.

Infrared touch screens and display devices according to one or more embodiments of the present disclosure adopt a first light-transmitting frame having two functions, which includes supporting a cover and transmitting light. By directly arranging a first protrusion part that may change a direction of light on a side of the first light-transmitting frame away from an infrared light source, a light filter strip may be omitted and installation of light filter strip is reduced. The first light-transmitting frame no longer needs to be provided with an installation structure for installing the light filter strip, thereby reducing a size of the first light-transmitting frame. The infrared light source is arranged in the first light-transmitting frame and located on a side of a light entrance surface of the cover. Since the first light-transmitting frame itself has light-transmitting properties, infrared light emitted by the infrared light source may be directly emitted from a first installation groove to the first protrusion part, and there is no need to specially set a light outlet at the first installation groove. After the infrared light is redirected by the first protrusion part, the light may propagate on a side of a light exit surface of the cover in a direction parallel to the light exit surface, and this part of the infrared light may be emitted to an infrared receiver. Therefore, compared with arranging the infrared light source on the side of light exit surface of the cover, in the infrared touch screen according to one or more embodiments of the present disclosure, the infrared light source is provided on the side of the cover close to the light entrance surface, so that a protrusion part of the first light-transmitting frame relative to the light exit surface of the cover does not need to reserve too much thickness for mounting the infrared light source. Furthermore, in the infrared touch screen according to one or more embodiments of the present disclosure, a thickness of the protrusion part of the frame of the infrared touch screen relative to the light exit surface of the cover may be reduced.

DETAILED DESCRIPTION

Technical solutions in one or more embodiments of the present disclosure will be clearly and completely described below in connection with the accompanying drawings in the embodiments of the present disclosure. It is apparent that the described embodiments are only part of embodiments of the present disclosure, and not all embodiments thereof. Based on the embodiments in the present disclosure, all other embodiments obtained by a person having skill in the art without any inventive effort fall within the protection scope of the present disclosure.

One or more embodiments of the present disclosure provide infrared touch screens and display devices to solve a problem that a frame of an infrared touch screen protrudes too high relative to a screen surface of the infrared touch screen.

Figure 1:
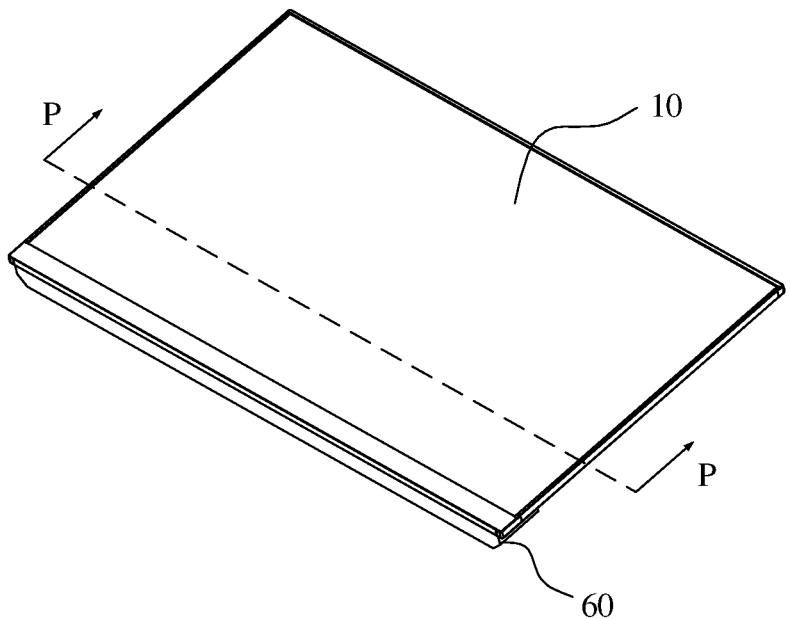
FIG. 1 is a schematic structural diagram of a display device according to one or more embodiments of the present disclosure.

Please refer to FIG. 1. FIG. 1 is a schematic structural diagram of a display device according to one or more embodiments of the present disclosure. One or more embodiments of the present disclosure provide an infrared touch screen 10 which may be applied to a display device 1. The display device 1 may include a liquid crystal display panel, electronic paper, a mobile phone, a tablet computer, a television, a monitor, a notebook computer, a digital photo frame, a navigation device, or any other product or component having a display function. The embodiments of the present disclosure do not limit a specific structure of the present disclosure. Of course, the infrared touch screen 10 according to the embodiments of the present disclosure may also be used alone without being applied to the display device 1, which is not limited in the embodiments of the present disclosure.

Figure 2:
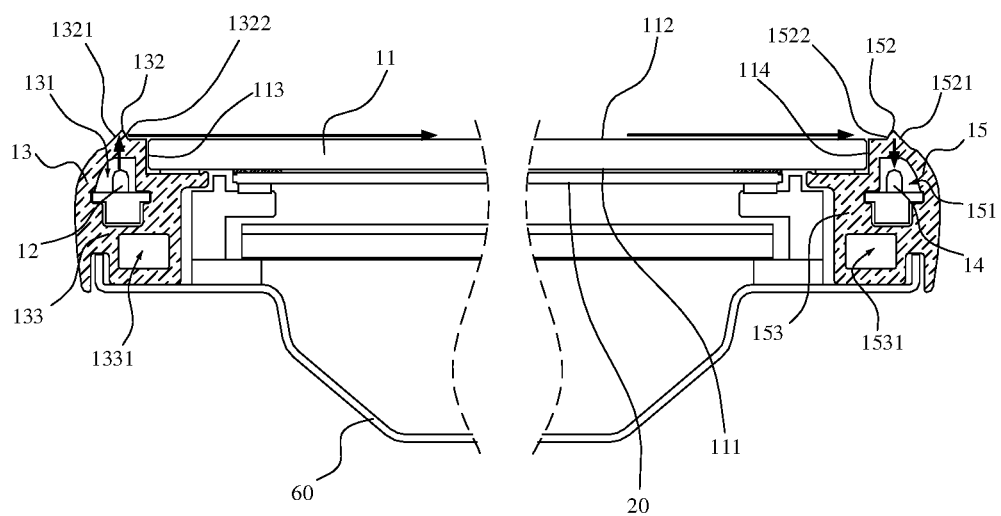
FIG. 2 is a cross-section view of an infrared touch screen of the display device taken along a P-P direction as shown in FIG. 1.

Please refer to FIG. 2. FIG. 2 is a cross-section view along a P-P direction of an infrared touch screen of the display device as shown in FIG. 1. Directions of thick arrows in the figure represents light propagation directions. In one or more embodiments of the present disclosure, the infrared touch screen 10 may include a cover 11, an infrared light source 12, a first light-transmitting frame 13, an infrared receiver 14, and a second light-transmitting frame 15.

For example, the cover 11 has a light entrance surface 111 and a light exit surface 112 arranged opposite to the light entrance surface 111. The cover 11 may include an acrylic cover, a glass cover, or other covers with light transmission properties. The infrared light source 12 and the infrared receiver 14 are arranged opposite to each other. The infrared light source 12 is fixed on the display device 1 through the first light-transmitting frame 13 and is configured to emit infrared light. The infrared receiver 14 is fixed on the display device 1 through the second light-transmitting frame 15 and is configured to receive the infrared light emitted by the infrared light source 12. At this time, the infrared light emitted by the infrared light source 12 is emitted to the infrared receiver 14 from outside of the light exit surface 112 of the cover 11. When a user's finger or an other object touches the light exit surface 112 of the cover 11, the infrared light emitted by the infrared light source 12 to the infrared receiver 14 is blocked, and thus a touching position where the user's finger or the other object touches the cover 11 may be detected. In one or more embodiments of the present disclosure, a plurality of sets of infrared light sources 12 and infrared receivers 14 may also be provided, wherein an infrared light source 12 and an infrared receiver 14 of each set of infrared light sources 12 and infrared receivers 14 cooperate with each other. Assuming that a beam of infrared light is formed between the infrared light source 12 and the infrared receiver 14 of each set of infrared light sources 12 and infrared receivers 14, a plurality of beams of infrared light may be arranged in a criss-cross pattern to form an infrared light network crisscrossed on a surface of the light exit surface 112. Therefore, when touching the light exit surface 112, the user's finger or the other object will block horizontal and vertical infrared light in the infrared light network, and a specific position of the user or other object on the light exit surface 112 of the cover 11 can be quickly located.

Figure 3:
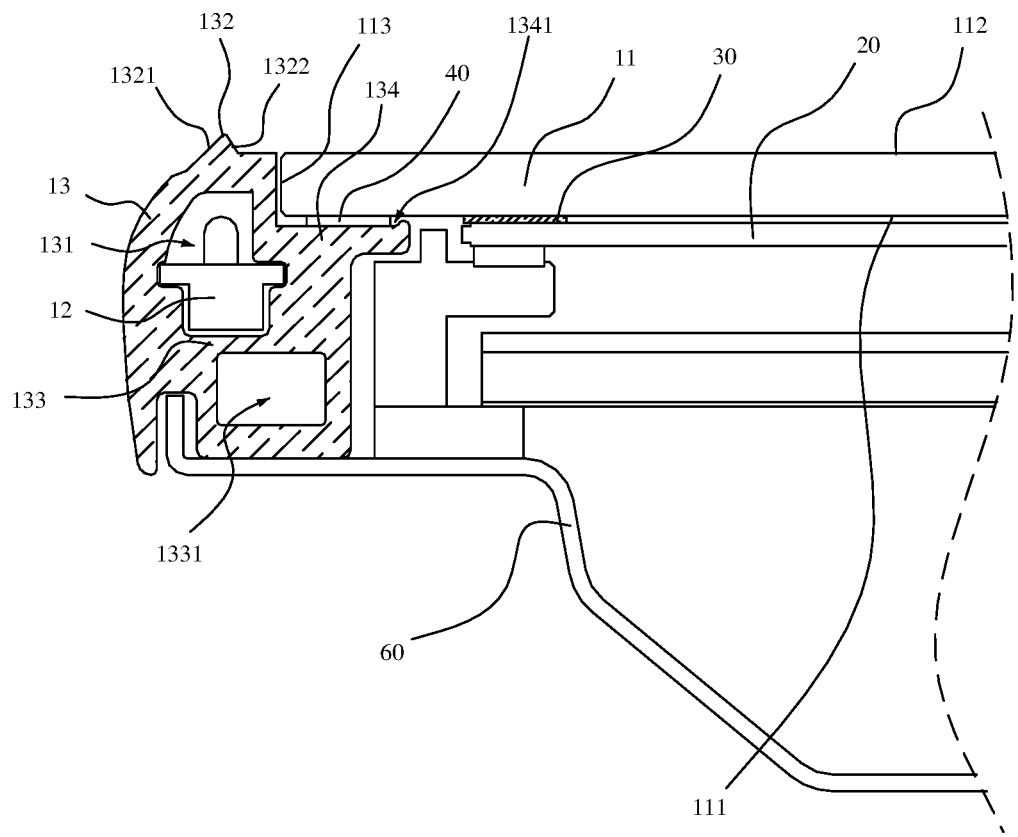
FIG. 3 is a schematic structural diagram of a portion of the infrared touch screen as shown in FIG. 2 with an infrared light source.

It should be understood that the cover 11 is disposed on a surface of a display component of the display device 1 to protect the display component of the display device 1. In some embodiments, the light entrance surface 111 of the cover 11 is attached to the display component, so that a pattern content displayed on the display component may be observed from a region of the cover 11 other than the light exit surface, after passing through the light entrance surface 111 and the light exit surface 112 of the cover 11 in sequence. For example, as shown in FIG. 3, FIG. 3 is a schematic structural diagram of the infrared touch screen as shown in FIG. 2 on a side of an infrared light source. A liquid crystal module 20 of the display component may be bonded and fixed to the light entrance surface 111 of the cover 11 through a Very High Bond (VHB) buffer sealant 30. Usually, the space on the side of the cover 11 close to the light entrance surface 111 is defined as in-screen space, and the space on the side of the cover 11 close to the light exit surface 112 is defined as off-screen space In related technologies, a frame is set on an edge of the cover. The infrared light source and the infrared receiver are set in the frame. The frame needs to have openings for transmitting light. To transmit the light emitted from the infrared light source on the side of the cover close to the light exit surface, the infrared light source and the infrared receiver are entirely located on the side of the cover close to the light exit surface, that is, located in the off-screen space. In this way, at least part of the frame needs to be located on the side of the cover close to the light exit surface, that is, located in the off-screen space. The at least part of the frame needs to be thick enough to install the infrared light source and the infrared receiver. Therefore, in related technologies, due to a volume of the infrared light source, it is difficult to further reduce a thickness of the frame of the infrared touch screen relative to a protrusion part of the cover. In addition, in order to change a direction of light, an additional light filter strip will be installed. In this way, the frame needs to be equipped with a structure to install the light filter strip, which further thickens the frame, and will affect the user's overall perception of the infrared touch screen and occupy more space.

Based on the above, please continue to refer to FIG. 3. In order to further reduce the thickness of the protrusion part of the frame relative to the cover 11, in one or more embodiments of the present disclosure, the infrared touch screen includes the first light-transmitting frame 13 and the cover 11. The cover 11 includes the light entrance surface 111 and the light exit surface 112 arranged opposite to the light entrance surface 111. The light entrance surface 111 and the light exit surface 112 are connected through a first side surface 113. The first light-transmitting frame 13 may be disposed on a side of the cover 11 having the first side surface 113 and may be connected with the cover 11. The first light-transmitting frame 13 is provided with a first installation groove 131, and the infrared light source 12 is installed in the first installation groove 131 and is on a side of the cover 11 close to the light entrance surface 111. That is, the infrared light source 12 is placed in the in-screen space of the cover 11. A side of the first light-transmitting frame 13 away from the infrared light source 13 is provided with a first protrusion part 132. At least part of the infrared light from the infrared light source 12 is emitted into the first protrusion part 132, and the first protrusion part 132 is configured to transmit the at least part of infrared light in a direction parallel to the light exit surface 112.

It should be understood that since the infrared light source 12 is disposed on the side of the cover 11 having the light entrance surface 111. A thickness of a protrusion part of the first light-transmitting frame 13 for mounting and fixing the infrared light source 12 relative to the light exit surface 112 of the cover 11 may be reduced significantly. Moreover, the first light-transmitting frame 13 is adopted. The first light-transmitting frame 13 has two functions, that is, supporting the cover 11 and transmitting light. By directly arranging the first protrusion part 132 that may change a direction of light on the side of the first light-transmitting frame 13 away from the infrared light source 12, a light filter strip may be omitted. The first light-transmitting frame 13 no longer needs to be provided with an installation structure for installing the light filter strip, thereby reducing a size of the first light-transmitting frame 13. The infrared light source 12 is arranged in the first light-transmitting frame 13 and located on the side of the cover 11 close to the light entrance surface 111. Since the first light-transmitting frame 13 itself has light-transmitting properties, the infrared light emitted from the infrared light source 12 may be directly emitted from the first installation groove 131 to the first protrusion part 132, and thus there is no need to specially set a light outlet at the first installation groove 131, thereby simplifying a structure. After the infrared light is redirected by the first protrusion part 132, the light may propagate on the side of the cover 11 close to the light exit surface 112 in the direction parallel to the light exit surface 112, and this part of the infrared light may be emitted to the infrared receiver 14. Therefore, by arranging the first light-transmitting frame 13 and positioning the infrared light source 12, the thickness of the protrusion part of the frame of the infrared touch screen 10 relative to the light exit surface 112 of the cover 11 in one or more embodiments of the present disclosure may be reduced.

The first light-transmitting frame 13 may be made of materials with light-transmitting properties, such as polycarbonate (PC, also referred to as PC plastic) and polymethyl methacrylate (PMMA, also referred to as organic glass or acrylic). The first protrusion part 132 is directly formed on the first light-transmitting frame 13. In some embodiments, the first light-transmitting frame 13 and the first protrusion part 132 are integrally formed.

It should be understood that, as shown in FIG. 3, to improve a screen-to-body ratio of the cover 11, the first protrusion part 132 is entirely located on the side of the cover 11 having the first side surface 113. That is, the first protrusion part 132 will not block the light exit surface 112 of the cover 11, the first protrusion part 132 protrudes upward relative to a plane where the light exit surface 112 of the cover 11 is located, so that the light redirected by the first protrusion part 132 may be transmitted in the direction parallel to the light exit surface 112 on the side of the cover 11 close to the light exit surface 112.

It should be understood that the first light-transmitting frame 13 is also configured not to block the light exit surface 112 of the cover 11. As shown in FIG. 3, in one or more embodiments of the present disclosure, the first light-transmitting frame 13 includes a first installation part 133, and the first installation part 133 is provided with the first installation groove 131 for mounting the infrared light source 12. It should be understood that when the infrared light source 12 is installed in the first installation groove 131, light may be directly emitted from the first installation groove 131 to the first protrusion part 132. The first light-transmitting frame 13 further includes a second installation part 134. For example, the second installation part 134 is provided on a side of the first installation part 133 facing the light entrance surface 111. The second installation part 134 and the light entrance surface 111 of the cover 11 are bonded through a first double-sided adhesive tape 40. As shown in FIG. 3, a side of the second installation part 134 facing the light entrance surface 111 is provided with a first adhesive groove 1341. A side of the first double-sided adhesive tape 40 away from the light entrance surface 111 is bonded to a bottom wall of the first adhesive groove 1341, and a side of the first double-sided adhesive tape 40 facing the light entrance surface 111 is bonded to the light entrance surface 111. When a thickness of the first double-sided adhesive tape 40 is equal to a depth of the first adhesive groove 1341, the bonded cover 11 may just press against a surface of the second installation part 134 facing the light entrance surface 111, so as to avoid the first double-sided adhesive tape 40 from causing the cover 11 to partially tilt relative to the second installation part 134. The first light-transmitting frame 13 with such a structure does not need to provide a connection structure fixed with the light exit surface 112 of the cover 11 on the light exit surface 112, and the first light-transmitting frame 13 will not block the light exit surface 112 of the cover 11. This may improve the screen-to-body ratio and reduce a height of the first protrusion part 132 relative to the plane where the light exit surface 112 is located.

In one or more embodiments of the present disclosure, as shown in FIG. 3, the first installation part 133 may be provided with a first lightening hole 1331 to reduce an overall weight of the infrared touch screen 10.

For example, as shown in FIG. 2 and FIG. 3, to enable the first protrusion part 132 to change the light propagation direction, the first protrusion part 132 may include a first total reflection surface 1321 and a first refractive surface 1322. The first total reflection surface 1321 is located on a side of the first protrusion part 132 away from the first side surface 113 and is inclined relative to the light exit surface 112, so as to be able to totally reflect the at least part of the infrared light, which is emitted from the infrared light source 12 into the first protrusion part 132, toward the cover 11. The first refractive surface 1322 is located between the first total reflection surface 1321 and the first side surface 113 and is inclined relative to the light exit surface 112 to refract the at least part of the infrared light totally reflected by the first total reflection surface 1321, so that the at least part of the infrared light emerges from the first protrusion part 132 in the direction parallel to the light exit surface 112.

It should be understood that a tilt angle of the first total reflection surface 1321 may be set according to actual situations, as long as the at least part of the infrared light, which is emitted from the infrared light source 12 into the first protrusion part 132, is totally reflected to the cover 11, and is refracted by the first refractive surface 1322 to emerge from the first protrusion part 132 in the direction parallel to the light exit surface 112.

In some embodiments, a texture structure may be provided on a side of the first total reflection surface 1321 away from the first refractive surface 1322. The texture structure may prevent external infrared light from entering the first protrusion part 132 to a certain extent, which may prevent the external light from interfering with the work of the infrared touch screen 10. The texture structure may be formed by etching on a side of the first total reflection surface 1321 away from the first refractive surface 1322. The texture structure may also be replaced with a first reflective layer made of reflective material such as a silver reflective film, that is, the silver reflective film may be provided on the side of the first total reflection surface 1321 away from the first refractive surface 1322.

Figure 4:
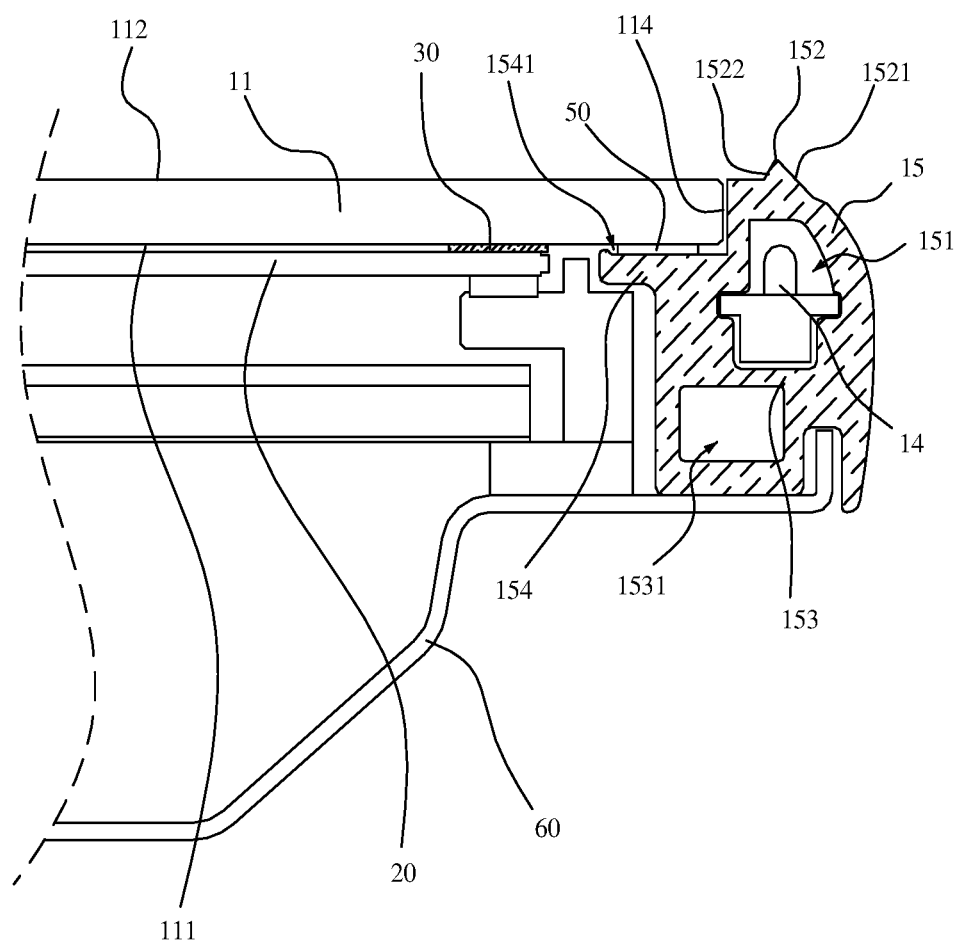
FIG. 4 is a schematic structural diagram of a portion of the infrared touch screen as shown in FIG. 2 with an infrared receiver.

Please refer to FIG. 4 in conjunction with FIG. 2. FIG. 4 is a schematic structural diagram of the infrared touch screen as shown in FIG. 2 on a side of an infrared receiver. In order to further reduce a thickness of a protrusion part of the second light-transmitting frame 15 relative to the cover 11, in one or more embodiments of the present disclosure, the cover 11 includes the light entrance surface 111 and the light exit surface 112 arranged opposite to the light entrance surface 111. The light entrance surface 111 and the light exit surface 112 are connected through a second side surface 114. The second side surface 114 is opposite to the first side surface 113. The second light-transmitting frame 15 may be disposed on a side of the second side surface 114 of the cover 11 and may be connected to the cover 11. The second light-transmitting frame 15 is provided with a second installation groove 151, and the infrared receiver 14 is installed in the second installation groove 151. The infrared receiver 14 is located on the side of the cover 11 close to the light entrance surface 111. That is, the infrared receiver 14 is arranged in the in-screen space of the cover 11. A side of the second light-transmitting frame 15 away from the infrared receiver 14 is provided with a second protrusion part 152. The second protrusion part 152 is opposite to the first protrusion part 132. The second protrusion part 152 may redirect the at least part of the infrared light that emerges from the first protrusion part 132 in the direction parallel to the light exit surface 112, so as to emit the at least part of the infrared light toward the infrared receiver 14.

It can be seen that the second light-transmitting frame 15 and the second protrusion part 152 thereon enable the infrared receiver 14 in the in-screen space to receive the at least part of the infrared light in the off-screen space that propagates in the direction parallel to the light exit surface 112, so as to realize a touching function of the infrared touch screen 10.

It should be understood that since the infrared receiver 14 is disposed on the side of the cover 11 having the light entrance surface 111. A thickness of a protrusion part of the second light-transmitting frame 15 for mounting and fixing the infrared receiver 14 relative to the light exit surface 112 of the cover 11 may be reduced significantly. Moreover, the second light-transmitting frame 15 is adopted. The second light-transmitting frame 15 has two functions, that is, supporting the cover 11 and transmitting light. By directly arranging the second protrusion part 152 that can change a direction of light on the side of the second light-transmitting frame 15 away from the infrared receiver 14, a filter strip may be omitted. The light-transmitting frame 15 no longer needs to be provided with an installation structure for installing the filter strip, thereby reducing a size of the second light-transmitting frame 15. The infrared receiver 14 is arranged in the second light-transmitting frame 15 and located on the side of the cover 11 close to the light entrance surface 111. Since the second light-transmitting frame 15 itself has light-transmitting properties, the infrared light energy emitted from the first protrusion part 132 to the second protrusion part 152 may be directly transmitted from the second protrusion part 152 to the infrared receiver 14 in the second installation groove 151, and thus there is no need to specially provide a light outlet at the second installation groove 151, thereby simplifying the structure. Therefore, by arranging the second light-transmitting frame 15 and positioning the infrared receiver 14, the thickness of the protrusion part of the frame of the infrared touch screen 10 relative to the light exit surface 112 of the cover 11 in one or more embodiments of the present disclosure may be reduced.

The second light-transmitting frame 15 may be made of materials with light-transmitting properties, such as polycarbonate (PC, also referred to as PC plastic) and polymethyl methacrylate (PMMA, also referred to as organic glass or acrylic). The second protrusion part 152 is directly formed on the second light-transmitting frame 15. In some embodiments, the second light-transmitting frame 15 and the second protrusion part 152 are integrally formed.

It should be understood that to increase the screen-to-body ratio of the cover 11, as shown in FIG. 4, the second protrusion part 152 is entirely located on the side of the cover 11 with the second side 114, that is, the second protrusion part 152 will not block the light exit surface 112 of the cover 11, the second protrusion part 152 protrudes upward relative to a plane where the light exit surface 112 of the cover 11 is located. The second protrusion part 152 is arranged opposite to the first protrusion part 132. In this way, the light passing through and redirected by the first protrusion part 132 enters the second protrusion part 152 and is redirected by the second protrusion part 152 and is emitted into the infrared receiver 14.

It should be understood that the second light-transmitting frame 15 is also configured not to block the light exit surface 112 of the cover 11. As shown in FIG. 4, in one or more embodiments of the present disclosure, the second light-transmitting frame 15 includes a third installation part 153, and the third installation part 153 is provided with a second installation groove 151 for mounting the infrared receiver 14. It should be understood that when the infrared receiver 14 is installed in the second installation groove 151, and light may directly enter the second installation groove 151 from the second protrusion part 152. The second light-transmitting frame 15 includes a fourth installation part 154. For example, the fourth installation part 154 is provided on a side of the third installation part 153 facing the light entrance surface 111. The fourth installation part 154 and the light entrance surface 111 of the cover 11 are bonded through a second double-sided adhesive tape 50. As shown in FIG. 4, a side of the fourth installation part 154 facing the light entrance surface 111 is provided with a second adhesive groove 1541. A side of the second double-sided adhesive tape 50 away from the light entrance surface 111 is bonded to a bottom wall of the second adhesive groove 1541, and a side of the second double-sided adhesive tape 50 facing the light entrance surface 111 is bonded to the light entrance surface 111. When a thickness of the second double-sided adhesive tape 50 is equal to a depth of the second adhesive groove 1541, the bonded cover 11 may just press against a surface of the fourth installation part 154 facing the light entrance surface 111, so as to avoid the second double-sided adhesive tape 50 from causing the cover 11 to partially tilt relative to the fourth installation part 154. The second light-transmitting frame 15 with such a structure does not need to provide a fixed connection structure with the light exit surface 112 of the cover 11, and the second light-transmitting frame 15 will not block the light exit surface 112 of the cover 11. This may improve the screen-to-body ratio and reduce a height of the second protrusion part 152 relative to the plane where the light exit surface 112 is located.

In one or more embodiments of the present disclosure, as shown in FIG. 4, the third installation part 153 may be provided with a second lightening hole 1531 to reduce an overall weight of the infrared touch screen 10.

For example, as shown in FIG. 2 and FIG. 4, to enable the second protrusion part 152 to change the light propagation direction, the second protrusion part 152 may include a second total reflection surface 1521 and a second refractive surface 1522. The second refractive surface 1522 is located on a side of the second protrusion part 152 close to the second side surface 114 and is inclined relative to the light exit surface 112 to refract the at least part of the infrared light that emerges from the first protrusion part 132 into the second protrusion part 152. The second total reflection surface 1521 is located on a side of the second protrusion part 152 away from the cover 11 and is tilted relative to the light exit surface 112 to totally reflect the at least part of the infrared light refracted by the second refractive surface 1522 to the infrared receiver 14.

It should be understood that a tilt angle of the second total reflection surface 1521 may be set according to actual situations, as long as the at least part of the infrared light emitted into the second protrusion part 152 is totally reflected to the infrared receiver 14.

In some embodiments, a texture structure may be provided on a side of the second total reflection surface 1521 away from the second refractive surface 1522, and the texture structure may prevent external infrared light from entering the second protrusion part 152 to a certain extent, which may prevent the external light from interfering with the work of the infrared touch screen 10. The texture structure may be formed by etching on a side of the second total reflection surface 1521 away from the second refractive surface 1522. The texture structure may also be replaced with a second reflective layer made of reflective material such as silver reflective film, that is, the silver reflective film may be provided on the side of the second total reflection surface 1521 away from the second refractive surface 1522.

In one or more embodiments of the present disclosure, as shown in FIG. 2, the display device 1 may further include a back plate 60. The back plate 60 is provided on the side of the cover 11 close to the light entrance surface 111. A side of each of the first light-transmitting frame 13 and the second light-transmitting frame 15 away from the cover 11 is provided with a connection groove. One end of the back plate 60 is inserted into the connection groove of the first light-transmitting frame 13 and is fixedly connected to the first light-transmitting frame 13, and the other end of the back plate 60 is inserted into the connection groove of the second light-transmitting frame 15 and is fixedly connected to the second light-transmitting frame 15.

In the above embodiments, each embodiment is described with its own emphasis. For parts that are not described in detail in a certain embodiment, please refer to the relevant descriptions of other embodiments.

In the description of this disclosure, the terms "first" and "second" are used for descriptive purposes only and cannot be understood as indicating or implying relative importance or implicitly indicating the number of indicated technical features. Therefore, the features defined as "first" and "second" may explicitly or implicitly include one or more features.

The embodiments of the present disclosure have been introduced in detail above. Specific examples are used in this article to illustrate the principles and implementation methods of the present disclosure. The description of the above embodiments is only used to help understand the method and the core idea of the present disclosure. Meanwhile, for those skilled in the art may make changes in a specific implementation and an application scope based on the ideas of the present disclosure. In summary, the content of this description should not be understood as a limitation of the present disclosure.

What is claimed is:

1. An infrared touch screen, comprising:
   a cover having a light entrance surface, a light exit surface arranged opposite to the light entrance surface, and a first side surface through which the light entrance surface is connected to the light exit surface;
   an infrared light source aligned with and configured to emit infrared light directly towards a first protrusion part; and
   a first light-transmitting frame arranged on a side of the cover having the first side surface and connected to the cover,
   wherein the first light-transmitting frame is provided with a first installation groove, and the infrared light source is installed in the first installation groove and located on a side of the cover close to the light entrance surface, and
   the first protrusion part is provided on a side of the first light-transmitting frame away from the infrared light source, and the first protrusion part is configured to receive at least part of the infrared light from the infrared light source and redirect the at least part of the infrared light in a direction parallel to the light exit surface;
   wherein the first protrusion part is entirely located on the side of the cover having the first side surface, the first protrusion part protrudes upward relative to a plane where the light exit surface of the cover is located, so that light redirected by the first protrusion part propagates on the side of the cover close to the light exit surface in the direction parallel to the light exit surface of the cover, the first light-transmitting frame comprises a first installation part and a second installation part, the first installation part is provided with the first installation groove, and the second installation part is provided on a side of the first installation part facing the light entrance surface, the second installation part is bonded to the light entrance surface via a first double-sided adhesive tape, a side of the second installation part facing the light entrance surface is provided with a first adhesive groove, a side of the first double-sided adhesive tape away from the light entrance surface is bonded to a bottom wall of the first adhesive groove, and a side of the first double-sided adhesive tape facing the light entrance surface is bonded to the light entrance surface, when a thickness of the first double-sided adhesive tape is equal to a depth of the first adhesive groove, the cover is pressed against a surface of the second installation part facing the light entrance surface; and wherein the first installation part is provided with a first lightening hole positioned below the first installation groove.

2. The infrared touch screen according to claim 1, wherein the first protrusion part has:
   a first total reflection surface arranged on a side of the first protrusion part away from the first side surface to totally reflect the at least part of the infrared light toward the cover; and
   a first refractive surface arranged between the first total reflection surface and the first side surface to refract the at least part of the infrared light totally reflected by the first total reflection surface, to emit the at least part of the infrared light from the first protrusion part in the direction parallel to the light exit surface.

3. The infrared touch screen according to claim 2, wherein a texture structure is provided on a side of the first total reflection surface away from the first refractive surface.

4. The infrared touch screen according to claim 2, wherein a first reflective layer is provided on a side of the first total reflection surface away from the first refractive surface.

5. The infrared touch screen according to claim 1, wherein the first light-transmitting frame and the first protrusion part are integrally formed.

6. The infrared touch screen according to claim 1, wherein the cover further has a second side surface arranged opposite to the first side surface, and the light entrance surface is connected to the light exit surface further through the second side surface; and
   the infrared touch screen further comprises:
   an infrared receiver configured to receive the infrared light emitted by the infrared light source; and
   a second light-transmitting frame arranged on a side of the cover having the second side surface and connected to the cover,
   wherein the second light-transmitting frame is provided with a second installation groove, and the infrared receiver is installed in the second installation groove and located on the side of the cover close to the light entrance surface, and
   a second protrusion part is provided on a side of the second light-transmitting frame away from the infrared receiver and is arranged opposite to the first protrusion part, and the second protrusion part is configured to redirect the at least part of the infrared light emitted from the first protrusion part in the direction parallel to the light exit surface, toward the infrared receiver.

7. The infrared touch screen according to claim 6, wherein the second protrusion part has:
   a second refractive surface arranged on a side of the second protrusion part close to the second side surface to refract the at least part of the infrared light, emitted from the first protrusion part, into the second protrusion part; and
   a second total reflection surface arranged on a side of the second protrusion part away from the cover to totally reflect the at least part of the infrared light, refracted by the second refractive surface, to the infrared receiver.

8. The infrared touch screen according to claim 7, wherein a texture structure is provided on a side of the second total reflection surface away from the second refractive surface.

9. The infrared touch screen according to claim 7, wherein a second reflective layer is provided on a side of the second total reflection surface away from the second refractive surface.

10. The infrared touch screen according to claim 6, wherein the second light-transmitting frame and the second protrusion part are integrally formed.

11. The infrared touch screen according to claim 6, wherein the second protrusion part is entirely located on the side of the cover having the second side surface.

12. The infrared touch screen according to claim 6, wherein the second light-transmitting frame comprises a third installation part and a fourth installation part, the third installation part is provided with the second installation groove, the fourth installation part is provided on a side of the third installation part facing the light entrance surface, and the fourth installation part and the light entrance surface are bonded through a second double-sided adhesive tape.

13. The infrared touch screen according to claim 12, wherein a second adhesive groove is provided on a side of the fourth installation part facing the light entrance surface, a side of the second double-sided adhesive tape away from the light entrance surface is bonded to a bottom wall of the second adhesive groove, and a side of the second double-sided adhesive tape facing the light entrance surface is bonded to the light entrance surface.

14. The infrared touch screen according to claim 12, wherein the third installation part is provided with a second lightening hole.

15. A display device, comprising the infrared touch screen according to claim 1.

16. An infrared touch screen, comprising:
   a cover having a light entrance surface, a light exit surface arranged opposite to the light entrance surface, and a second side surface through which the light entrance surface is connected to the light exit surface;
   an infrared receiver aligned with and configured to receive infrared light directly from a second protrusion part; and
   a second light-transmitting frame arranged on a side of the cover having the second side surface and connected to the cover,
   wherein the second light-transmitting frame is provided with a second installation groove, and the infrared receiver is installed in the second installation groove and located on a side of the cover close to the light entrance surface, and
   the second protrusion part is provided on a side of the second light-transmitting frame away from the infrared receiver, and the second protrusion part is configured to redirect the infrared light, propagating in a direction parallel to the light exit surface, toward the infrared receiver;
   wherein the second protrusion part is entirely located on the side of the cover having the second side surface, the second protrusion part protrudes upward relative to a plane where the light exit surface of the cover is located, so that light redirected by the second protrusion part propagates on the side of the cover close to the light exit surface in the direction parallel to the light exit surface of the cover, the second light-transmitting frame comprises a third installation part and a fourth installation part, the third installation part is provided with the second installation groove, and the fourth installation part is provided on a side of the third installation part facing the light entrance surface, the fourth installation part is bonded to the light entrance surface via a second double-sided adhesive tape, a side of the fourth installation part facing the light entrance surface is provided with a second adhesive groove, a side of the second double-sided adhesive tape away from the light entrance surface is bonded to a bottom wall of the second adhesive groove, and a side of the second double-sided adhesive tape facing the light entrance surface is bonded to the light entrance surface, when a thickness of the second double-sided adhesive tape is equal to a depth of the second adhesive groove, the cover is pressed against a surface of the fourth installation part facing the light entrance surface;

wherein the third installation part is provided with a second lightening hole positioned below the second installation groove.

\* \* \* \* \*